US009154923B2

(12) United States Patent
Bai et al.

(10) Patent No.: US 9,154,923 B2
(45) Date of Patent: Oct. 6, 2015

(54) SYSTEMS AND METHODS FOR VEHICLE-BASED MOBILE DEVICE SCREEN PROJECTION

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); Bo Yu, Warren, MI (US); Lakshmi V. Thanayankizil, Rochester Hills, MI (US); David P. Pop, Garden City, MI (US); Robert A. Hrabak, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/186,026

(22) Filed: Feb. 21, 2014

(65) Prior Publication Data
US 2015/0245181 A1    Aug. 27, 2015

(51) Int. Cl.
*H04M 3/42*     (2006.01)
*H04W 4/06*     (2009.01)
*H04W 4/16*     (2009.01)
*H04W 4/00*     (2009.01)
*H04L 29/08*    (2006.01)

(52) U.S. Cl.
CPC ................ *H04W 4/06* (2013.01); *H04L 67/12* (2013.01); *H04W 4/008* (2013.01); *H04W 4/16* (2013.01)

(58) Field of Classification Search
CPC .......... H04L 29/08108; H04M 1/6066; H04M 1/72533; H04W 8/245
USPC ........ 455/569.1, 420, 418, 550.1, 557, 414.1; 381/300, 302; 701/419
See application file for complete search history.

(56) References Cited

U.S. PATENT DOCUMENTS

| 7,966,111 B2* | 6/2011 | Moinzadeh et al. ......... 701/29.6 |
| 8,224,300 B2* | 7/2012 | de Silva .................... 455/414.1 |
| 8,548,532 B1* | 10/2013 | Ng ............................. 455/569.1 |
| 8,750,942 B1* | 6/2014 | Ng ............................. 455/569.1 |
| 8,966,366 B2* | 2/2015 | Tom ................................. 715/716 |
| 9,002,567 B2* | 4/2015 | Barrett et al. .................... 701/28 |
| 2002/0168970 A1* | 11/2002 | Myojo .......................... 455/426 |
| 2003/0096641 A1* | 5/2003 | Odinak ......................... 455/569 |
| 2010/0220250 A1* | 9/2010 | Vanderwall et al. .......... 348/837 |
| 2010/0260350 A1* | 10/2010 | Chutorash et al. .............. 381/86 |
| 2011/0099316 A1* | 4/2011 | Tseng et al. .................. 710/304 |
| 2011/0257973 A1* | 10/2011 | Chutorash et al. ........... 704/235 |
| 2011/0263293 A1* | 10/2011 | Blake et al. ................... 455/557 |
| 2012/0183221 A1* | 7/2012 | Alasry et al. .................. 382/181 |
| 2014/0120890 A1* | 5/2014 | Barrett et al. ................. 455/418 |

* cited by examiner

*Primary Examiner* — Babar Sarwar
(74) *Attorney, Agent, or Firm* — Ingrassia Fisher & Lorenz, P.C.

(57) ABSTRACT

A mobile device screen projection system for an in-vehicle display is provided. The system receives mobile device content from a mobile device, receives context data from a plurality of information sources associated with at least one of the vehicle and the mobile device, determines an integrated context based on the context data, and selectively renders the mobile device content on the in-vehicle display based on the integrated context.

13 Claims, 4 Drawing Sheets

SYSTEMS AND METHODS FOR VEHICLE-BASED MOBILE DEVICE SCREEN PROJECTION

TECHNICAL FIELD

The technical field generally relates to vehicular display systems, and more particularly relates to methods and systems for mobile device screen projection used in connection with such display systems.

BACKGROUND

Modern vehicles, particularly automobiles, often incorporate one or more in-vehicle displays to provide user-interface functionality for various vehicle systems and subsystems, such as the navigation, climate control, infotainment, and other such systems accessible by the driver and/or passengers of the vehicle. In recent years, there has been significant interest in utilizing mobile devices such as phones, tablets, and the like in combination with on-board systems, such as the in-vehicle display. Specifically, it is often desirable to project mobile device content (such as audio, video, etc.) onto the in-vehicle display so that it can be shared and more easily viewed by the passenger and (in some cases) the driver. In this way, a mobile device can itself be used as an in-vehicle infotainment system.

Such mobile device screen projection systems pose significant challenges, however—not the least of which is controlling when and to what extent certain types of mobile device content should be available to the driver. Previous attempts to solve this problem typically involve simply preventing projection of mobile device content in all but a few cases, with no consideration of the current context, for example, the state of the driver, the speed of the car, the environment, etc.

Accordingly, it is desirable to provide improved systems and methods for selectively controlling mobile device screen projection based on context. Furthermore, other desirable features and characteristics of the present invention will become apparent from the subsequent detailed description and the appended claims, taken in conjunction with the accompanying drawings and the foregoing technical field and background.

SUMMARY

In accordance with one embodiment, a mobile device screen projection method for an in-vehicle display receives mobile device content from a mobile device, receives context data from a plurality of information sources associated with at least one of the vehicle and the mobile device, determines an integrated context based on the context data; and selectively renders the mobile device content on the in-vehicle display based on the integrated context.

A mobile device screen projection system in accordance with one embodiment includes a vehicle context engine communicatively coupled to a rendering control module. The vehicle context engine is configured to receive context data from a plurality of information sources associated with at least one of the vehicle and the mobile device, and to determine an integrated context based on the context data. The rendering control module is configured to receive mobile device content from a mobile device and selectively render the mobile device content on the in-vehicle display based on the integrated context.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

In general, the subject matter described herein relates to improved systems and methods for vehicle-based mobile device screen projection in which mobile device content (e.g., audio, video, text, haptic data, or the like) is received from a mobile device, context data relating to the driver, the vehicle, and/or other sources is received from a plurality of information sources (e.g., vehicle sensor data, mobile device sensor data, Internet data), an integrated context is determined based on the context data, and the mobile device content is selectively rendered on the in-vehicle display based on the integrated context.

Figure 1:
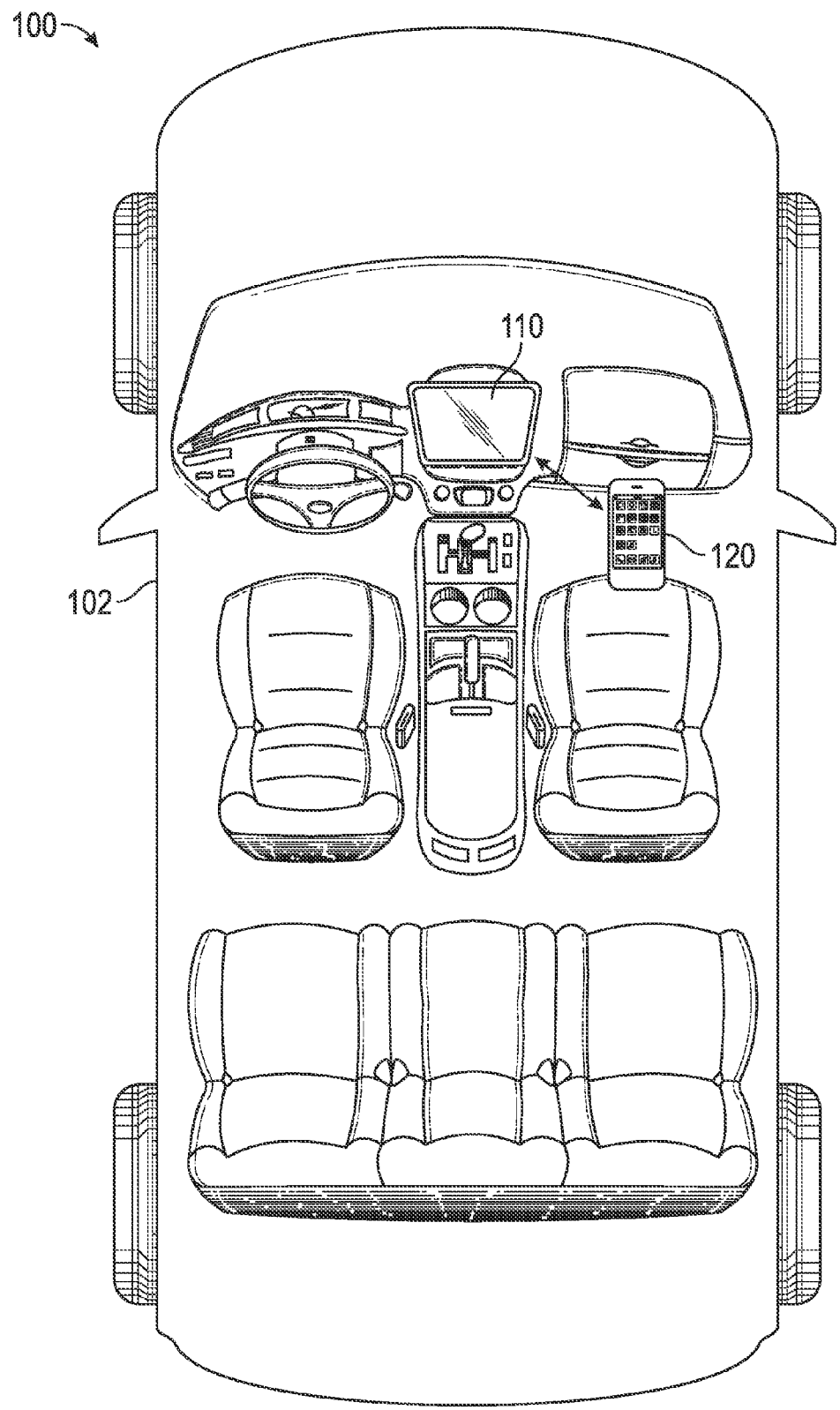
FIG. 1 is a conceptual overview of an automotive interior useful in illustrating various embodiments.

Referring now to FIG. 1, in accordance with exemplary embodiments of the subject matter described herein, a vehicle 100 includes an in-vehicle, integrated display (or simply "display") 110. Display 110 may be utilized by a variety of systems, modules, and sub-modules within vehicle 100 (not illustrated) to provide an image viewable by the driver and/or passengers within the interior 102 of vehicle 100. For example, display 110 might typically be used in connection with a navigation system, a climate control system, a vehicle infotainment system, and the like.

Display 110, which might be implemented as a liquid-crystal (LCD) display or any other such suitable display type known in the art, is illustrated in FIG. 1 as located in the center-front dash; however, the present disclosure is not so limited. The size, shape, orientation, and position of display 110 may vary depending upon, for example, the vehicle type, geometrical constraints, and the like. Furthermore, while display 110 is described as "integrated" into vehicle 100, in some embodiments display 110 might be removeably secured within the vehicle. As used in relation to display 110, the term "integrated" means that display 110 is configured to be used, in the ordinary course, as a part of vehicle 100 (as opposed to, for example, mobile device 120). In accordance with various embodiments, display 110 is a touch-screen display that allows users to interact with various subsystems of vehicle 100 using a variety of user interface display elements as is known in the art.

As illustrated, one or more mobile devices 120 might be present within interior 102 of vehicle 100, including, for example, one or more smart-phones, tablets, laptops, feature phones, or other the like. In accordance with exemplary embodiments, mobile device 120 may be communicatively coupled to display 110 through one or more intervening modules, processors, etc. (not illustrated), and via a suitable wireless data connection, such as Bluetooth or WiFi. In this way, mobile device content such as music, images, video, and text generated by mobile device 120 may be displayed, or "rendered", on display 110. Various communication standards (such as MirrorLink/Miracast) have been developed to assist in such communication.

Figure 2:
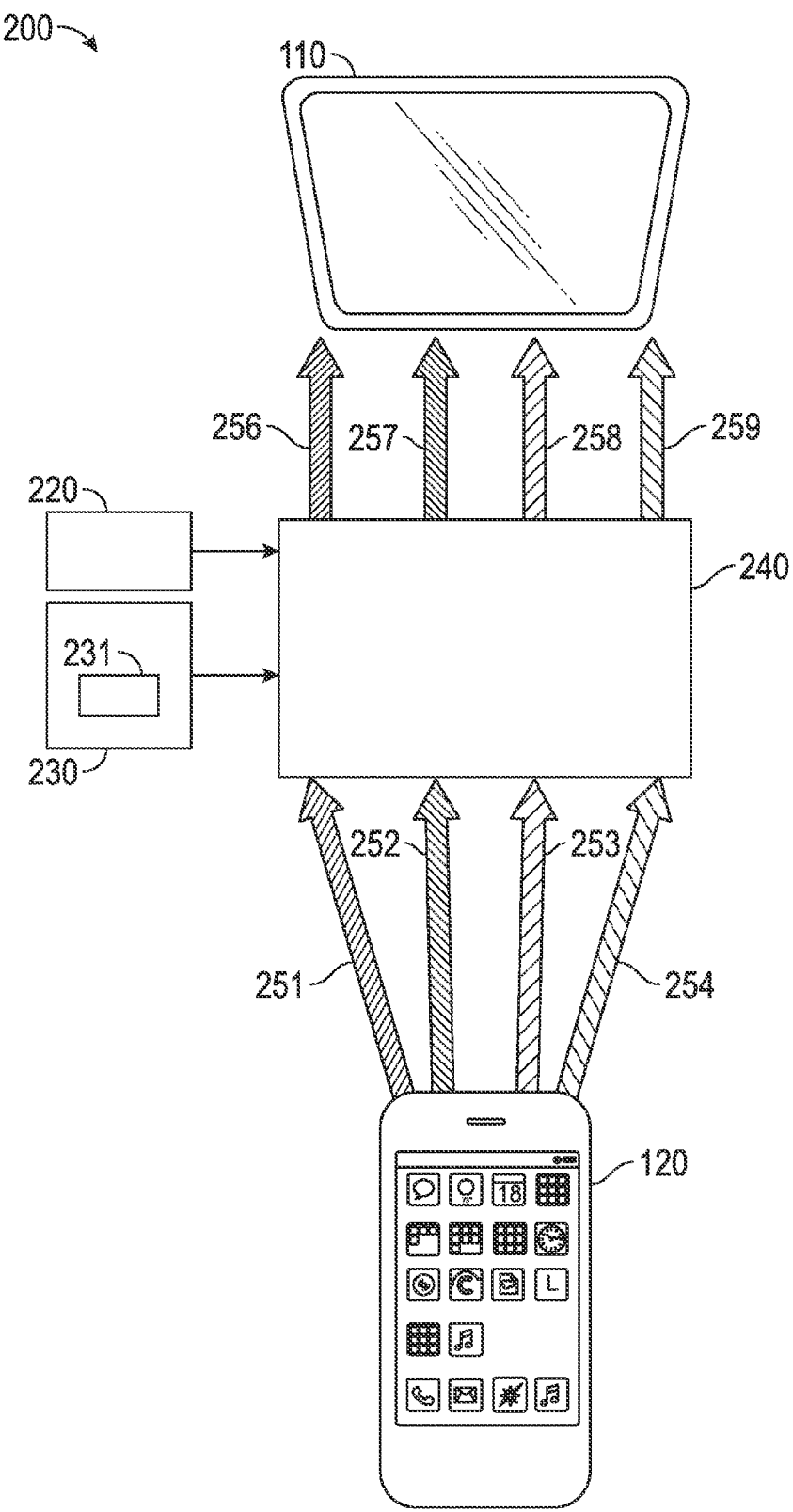
FIG. 2 is a functional block diagram of a mobile device screen projection system in accordance with various exemplary embodiments.

Referring now to FIG. 2 in combination with FIG. 1, a mobile device screen projection system 200 for use in conjunction with an in-vehicle display 110 and one or more mobile devices 120 includes a vehicle context engine 220, a display policy module (or simply "policy module") 230, and a rendering control module 240 configured to receive mobile device content 251-254.

In general, and as described in further detail below, vehicle context engine 220 includes any combination of hardware and/or software configured to receive context data from a plurality of information sources associated with vehicle 100, mobile device 120, or any other information source that might be available and useful to vehicle context engine 220 in determining the aggregate or "integrated" context in which vehicle 100 and therefore display 110 is being used (e.g., "sleepy driver," "snow on roads", "speed is moderate", etc.).

Display policy module 230 includes any combination of hardware and/or software configured to store or otherwise provide a "policy profile" that specifies a set of permitted display levels associated with corresponding integrated contexts. That is, display policy module 230 specifies whether and to what extent certain types of mobile device content (e.g., mobile device content 251-254) should be accessible to the driver or other user given the current integrated context. For example, in the case of an integrated context indicating that "speed is high," the policy profile might specify that only text and audio (but not video) should be rendered by display 110. Similarly, in the case of an integrated context indicating that "speed is low" and "driver is alert", the policy profile might specify video as well as text and audio might be displayed. In one embodiment, the set of permitted display levels includes levels corresponding to "fully blocked" (no mobile device content should be displayed), "partially blocked" (mobile device content is displayed in a limited manner, e.g., reduced size, reduced frame rate, only on passenger or rear entertainment display), reduced dimensionality (for example, a 3D graph converted to a 2-D graph), "text only," "audio only," "video only," and "audio and video." It will be appreciated, however, that the invention is not so limited. Any suitable set of criteria, rules, logic, and the like may be used to implement the policy profile of display policy module 230. The data and/or rules associated with the policy profile may be stored, for example, within a datastore 231 provided by display policy module 230. In one embodiment, the policy profile is configurable—i.e., modifiable based on, for example, manufacturer preferences, driver study data, regulatory requirements, best practices, and other such policy metrics.

Rendering control module 240 includes any combination of hardware and/or software configured to receive mobile device content (e.g., mobile device content 251-254) from a mobile device 120 and selectively render the mobile device content (as content 256-259) on display 110 based on the integrated context received from vehicle context engine 220.

In this regard, rendering control module 240 may employ the policy profile provided by display policy module 230 as described above.

Mobile device content 251-254 might include any of the various types of content (or output) produced by mobile device 120. In one embodiment, the mobile device content 251-254 includes audio content. Such audio content might include, for example, music (stored within mobile device 120 or streamed from an external source), spoken-word performances, audio podcasts, turn-by-turn directions, or the like. Similarly, mobile device content 251-254 might include still or motion video content such as film video, television programming, video podcasts, map images, photographs, user interface images, and the like. Mobile device content 251-254 might also include haptic feedback data—i.e., data indicating that some sort of haptic feedback (in the form of forces, vibrations, and/or motion) would typically be provided, in that context, to the user. Mobile device content 251-254 might also include application metadata, i.e., data indicating which application within mobile device (e.g., an "application ID") is producing particular mobile device content. In yet another embodiment, mobile device content 251-254 includes simple text data (e.g., status messages) to be rendered onto display 110.

Regardless of the particular types of mobile device content produced by mobile device 120, rendering control module 240 receives mobile device content 251-254 and selectively renders the mobile device content (illustrated as respective arrows 256-259) on display 110. In the illustrated embodiment, all of the mobile device content 251-254 is rendered (effectively "passed through") to display 110 as content 256-259. Such a case might correspond, for example, to the scenario where the vehicle is parked and all mobile device content 251-254 may safely be provided to the user. In other scenarios, one or more of mobile device content 251-254 might be blocked. For example, display 110 might receive limited content, such as mobile device content 252.

In some embodiments, rendering control module 240 determines both the content to be rendered and the presentation of that content. That is, rendering control module 240 might determine that a certain type of mobile device content may be rendered by display 110, but only if it is presented in a certain form. For example, it might be determined that video content may be displayed in a relatively small window at the corner of display 110, or that certain audio content may be played at a very low volume. Other options may include providing a still image of motion video content during a blocked scenario (with an optional text message indicating content unavailable due to driving conditions) or updating the video frames at a very slow rate (e.g., 1 frame per 5 seconds).

With respect to vehicle context engine 220, "context data" includes any data that may be used to determine the state of vehicle 100 or its occupants, including the driver of the vehicle. In this regard, context data might take a variety of forms, including, for example, numerical or alphanumerical values that can be stored and processed digitally by a processor, as is known in the art.

Figure 4:
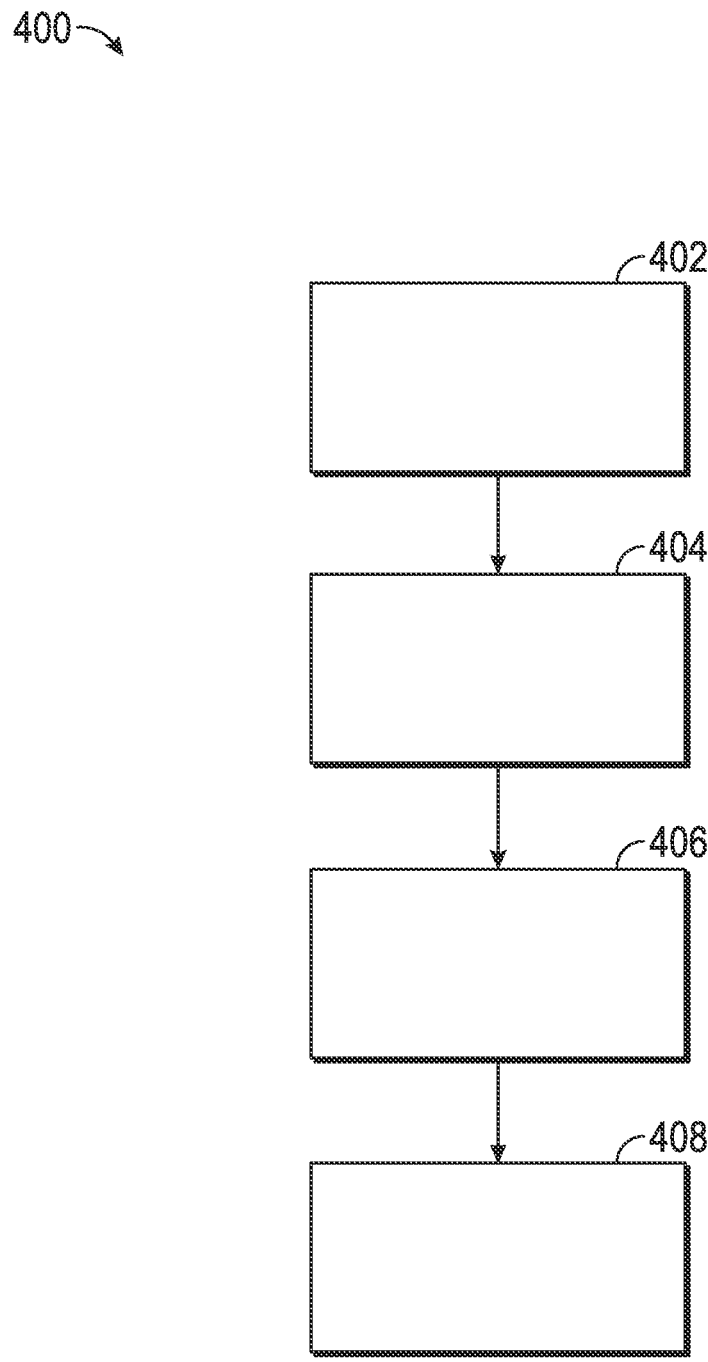
FIG. 4 is a flow chart depicting a method in accordance with an exemplary embodiment.

Referring now to FIGS. 2 and 4, a mobile device screen projection method in accordance with various embodiments will now be described. The method consists of four steps: 402-408, which may be performed wholly or in part by rendering control module 240. First, at 402, mobile device content (251-254) is received by rendering control module 240 from mobile device 120. As noted above, such content might include video, audio, metadata, text, haptic data, and the like. Next, at 404, context data is received by vehicle context engine 220 from a plurality of information sources associated with the vehicle and/or mobile device 120. The nature of such information sources will be described in detail below; however, in an exemplary embodiment the information sources include sensors (for example, temperature sensors and accelerometers) incorporated into vehicle 100 as well as sensors integrated into mobile device 120. Next, at 406, an integrated context is determined based on the context data. This integrated context, also described below, encompasses relevant context information derived from the various information sources, and will typically include context relating to the driver (e.g., alertness), the vehicle (e.g., speed, acceleration), and the environment (e.g., raining, foggy, etc.). Finally, at 408, the mobile device content 251-254 is selectively rendered on the in-vehicle display 110 based on the integrated context. In this way, rendering can be limited to the most appropriate mobile content (if any) based on a robust and highly customizable analysis of the current context.

Figure 3:
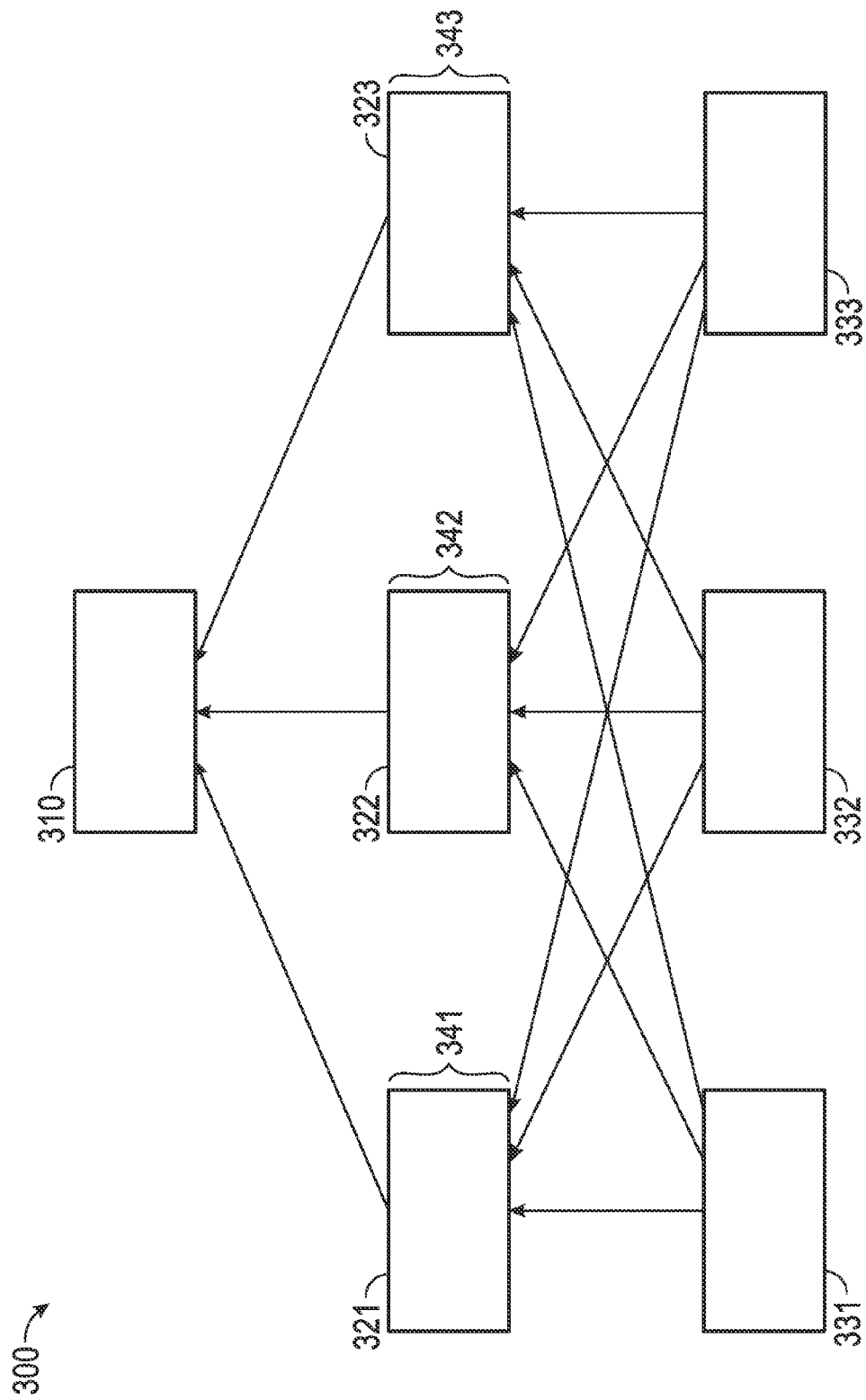
FIG. 3 is a conceptual block diagram illustrating a vehicle context engine in accordance with exemplary embodiments.

FIG. 3 is a conceptual block diagram or hierarchy that illustrates a vehicle context engine 300 suitable for implementing vehicle context engine 220 of FIG. 2. In accordance with the illustrated embodiment, vehicle context engine 300 includes a synthetic context module 310 configured to determine the "integrated context" based on driver context module 321, vehicle context module 322, and environment module 323, wherein each of the context modules 321-323 makes a context determination based on various information sources, illustrated as vehicle sensor data 331, mobile device sensor data 332, and external data source 333.

Driver context module 321 provides to module 310 a driver context (or contexts) selected from a set 341 of such predefined contexts. For example, set 341 might include, but is not limited to, numerical and/or alphanumerical codes corresponding to "driver drowsy", "driver distracted", "driver tired", "driver normal", and any other code useful in describing the state of the driver. Such information may originate from a vehicle-based driver monitoring system, a separate wearable health monitoring device, the users' mobile device, or information derived from Internet information sources (e.g., user is currently active in an online meeting, etc.).

Similarly, vehicle context module 322 provides to module 310 a vehicle context (or contexts) selected from a set 342. For example, set 342 might include, but is not limited to, numerical and/or alphanumerical codes corresponding to "low speed", "high speed", "stopped", "parked", and any other code suggesting a state of the vehicle. Such information may originate exclusively from onboard vehicle systems, or may be augmented/combined with information provided by a mobile device or Internet data (e.g., the system may block certain types of mobile device content if other mobile devices are detected inside the vehicle).

Finally, environment context module 323 provides to module 310 an environment context (or contexts) selected from a set 343 of such predefined contexts. For example, set 343 might include, but is not limited to, numerical and/or alphanumerical codes corresponding to "rain", "fog", "snow", "traffic congestion", "in tunnel", and any other code suggesting a state of the environment in which the vehicle is being operated. It will be appreciated that the foregoing examples are not intended to be limiting, and that any suitable set of contexts and context modules may be used in any particular application.

A variety of information sources may be useful in generating information for context modules 321-323. In the illustrated embodiment, for example, the available information sources include vehicle sensor data 331, mobile device sensor data 332, and external information source (e.g., Internet data that is accessible through a vehicle telematics module or via a paired mobile device) 333. Vehicle sensor data 331 might include, for example, basic vehicle information such as speed, acceleration, GPS position, as well as information generated by any of the numerous sensors such as temperature sensors, tire pressure sensors, and the like that are typically incorporated into modern vehicles. Such sensor information is, in modern vehicles, often transmitted over a vehicle's controller area network (CAN). Mobile device sensor data 332 includes any sensor data available from mobile device 120, including, for example, multi-axis accelerometer data, gyroscope data, user health information and microphone data (e.g., to assist in determining the noise level in the vehicle). External information source 333 includes any information available from a network remote from the car—e.g., information available from a server (such as a weather or traffic server) over the Internet or other network.

The list of information sources provided above is not intended to be limiting. In general, any information source that might be useful for context modules 321-323 may be employed, even if that information source produces substantially redundant data. For example, vehicle 100 might include one or more microphones built into interior 102 and which might be useful as an information source in determining the noise level in conjunction with similar noise level information received from mobile device 120 (i.e., via information source 332). In other embodiments, nearby vehicles that are accessible via a wireless network (such as an ad-hoc network) might act as an information source. For example, a nearby vehicle might report that an icy road exists ahead of vehicle 100. In yet another embodiment, wearable computing devices may be used as information sources. For example, the orientation or characteristic movement of a device worn on the driver's head (such as the GOOGLE GLASS device manufactured by Google, Inc.) might be used to determine whether the driver is alert or nodding off intermittently.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A mobile device screen projection method for an in-vehicle display, the method comprising:
   receiving mobile device content from one or more mobile devices;
   receiving context data from a plurality of information sources, the plurality of information sources includes at least one of sensor data associated with the one or more mobile devices, and external data received from a network remote from the vehicle;
   determining an integrated context based on the context data; and
   selectively rendering the mobile device content on the in-vehicle display based on the integrated context;
   wherein selectively rendering the mobile device content includes selectively blocking the mobile device content based on a policy profile that specifies a set of permitted display levels associated with corresponding integrated contexts; and wherein the set of permitted display levels includes levels corresponding to "fully blocked," "partially blocked", "text only," "audio only," "video only," and "audio and video."

2. The method of claim 1, wherein the mobile device content includes at least one of video content, audio content, application metadata, and haptic data.

3. The method of claim 1, wherein the context data includes driver context data, vehicle context data, and environment data.

4. The method of claim 1, wherein selectively rendering the mobile device content includes selecting the mobile device content to be rendered, and selecting a presentation format.

5. A mobile device screen projection system for an in-vehicle display, the system comprising:

a vehicle context engine having a processor and configured to receive context data from a plurality of information sources, and to determine an integrated context based on the context data, the plurality of information sources includes at least one of sensor data associated with one or more mobile devices, and external data received from a network remote from the vehicle; and a rendering control module having a processor and communicatively coupled to the vehicle context engine, the rendering control module configured to receive mobile device content from the mobile device and selectively render the mobile device content on the in-vehicle display based on the integrated context;

a display policy module communicatively coupled to the rendering control module, the display policy module including a policy profile that specifies a set of permitted display levels associated with corresponding integrated contexts;

wherein the rendering control module selectively renders the mobile device content by selectively blocking the mobile device content based on the policy profile; and wherein the set of permitted display levels includes levels corresponding to "fully blocked," "partially blocked", "text only," "audio only," "video only," and "audio and video."

6. The system of claim 5, wherein the mobile device content includes at least one of video content, audio content, application metadata, and haptic data.

7. The system of claim 5, wherein the context data includes driver context data, vehicle context data, and environment data.

8. The system of claim 7, wherein the driver context data includes at least one of driver distraction level, driver fatigue, and presence of passengers.

9. The system of claim 7, wherein the vehicle context data includes at least one of the speed of the vehicle and a parking state of the vehicle.

10. The system of claim 7, wherein the environment data includes at least one of roadway congestion level and weather data.

11. The system of claim 5, the rendering control module selects the mobile device content to be rendered and a presentation format for the mobile device content.

12. Non-transitory computer-readable medium bearing software instructions configured to cause a processor to perform the steps of:

receive context data derived from a plurality of information sources, the plurality of information sources includes at least one of sensor data associated with a mobile device, and external data received from a network remote from the vehicle;

determine an integrated context based on the context data;

receive mobile device content from the mobile device; and selectively render the mobile device content on a display integrated into the vehicle based on the integrated context;

wherein the mobile device content is selectively rendered by selectively blocking the mobile device content based on a policy profile that specifies a set of permitted display levels associated with corresponding integrated contexts, the set of permitted display levels includes levels corresponding to "fully blocked," "partially blocked", "text only," "audio only," "video only," and "audio and video."

13. The non-transitory computer-readable medium of claim 12, wherein the mobile device content includes at least one of video content, audio content, application metadata, and haptic data.

* * * * *